Sept. 8, 1925.
H. C. SALLAC
CUT FORK
Filed Nov. 20, 1924
1,553,006
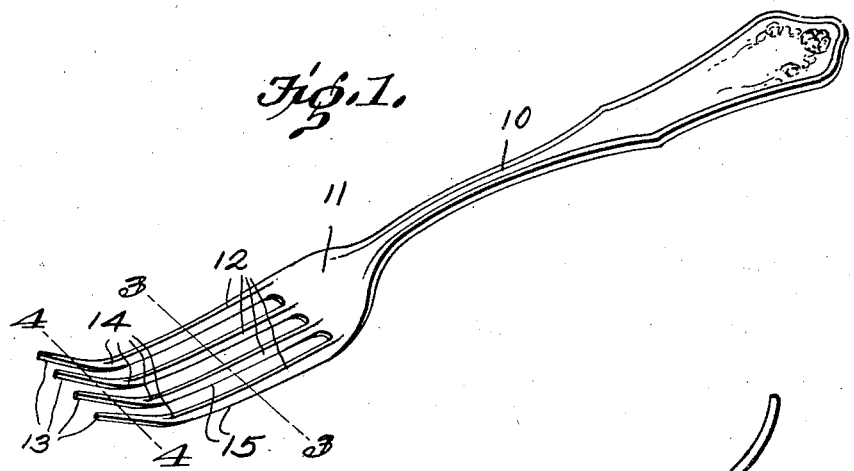
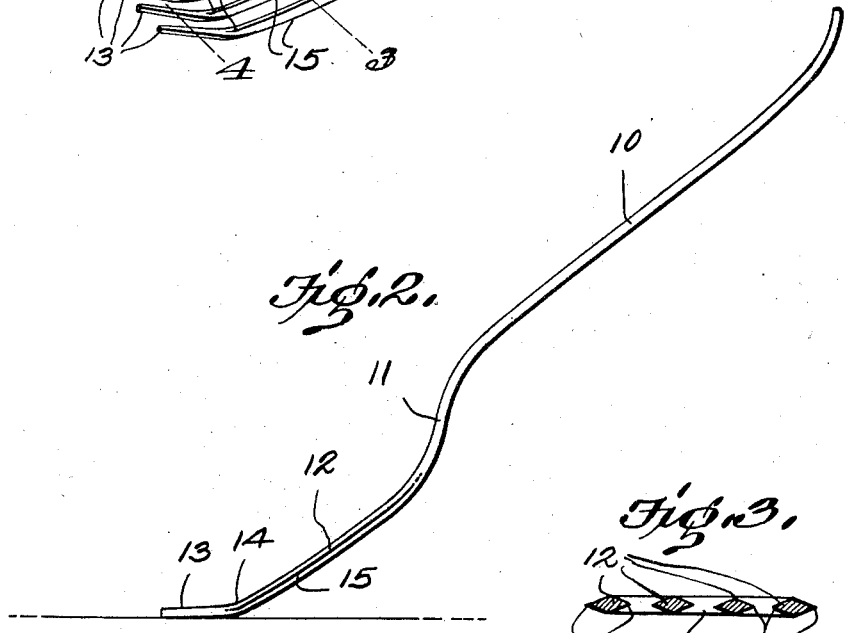
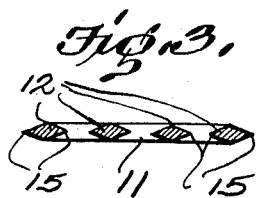
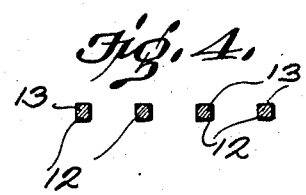
Inventor
Harry C. Sallac Patented Sept. 8, 1925.

1,553,006

UNITED STATES PATENT OFFICE.

HARRY C. SALLAC, OF ST. LOUIS, MISSOURI.

CUT FORK.

Application filed November 20, 1924. Serial No. 751,108.

*To all whom it may concern:*

Be it known that I, HARRY C. SALLAC, a citizen of the United States, residing at St. Louis, in the county of St. Louis City and State of Missouri, have invented certain new and useful Improvements in Cut Forks, of which the following is a specification.

The present invention relates to an instrument for use in eating, and aims to provide a novel and improved device of that character having parallel spaced prongs or tines with cutting edges provided thereon, said prongs or tines also having their free ends turned upwardly so that food may be easily maintained thereon, such a device eliminating the necessity of using various instruments while eating, the improved device being constructed so as to function efficiently for use as either a knife or fork without interfering with its function for the other purpose. Such a device will be found very useful and practical in crowded restaurants, soda fountains, and the like.

Another object of the invention is to provide an improved instrument of the above indicated character, having a series of parallel spaced prongs or tines similar to and to accomplish the same purpose as an ordinary fork, said prongs or tines being bent upwardly at an angle adjacent their outer ends and each having the opposite sides thereof beveled from both the top and bottom to provide cutting edges, said cutting edges terminating at the point where the tines or prongs are turned upwardly, so as to prevent injury to the mouth of the user when the device is used for the purpose of a fork, and so as not to interfere with the use of the device as a knife.

It is also an object of the invention to provide an implement of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:

Figure 1 is a perspective view of my improved device,

Figure 2 is a side elevation thereof,

Figure 3 is a section taken on line 3—3 of Figure 1, and

Figure 4 is a section on line 4—4 of Figure 1.

In carrying out my invention, the numeral 10 indicates the handle having the shank or body portion 11 integral therewith, while the numeral 12 designates the tines or prongs extending from the shank or body portion 11, all of which is similar to the construction of an ordinary table fork.

The tines or prongs 12 are arranged parallel to each other and are curved slightly, similar to the ordinary fork, and have their outer free ends 13 turned upwardly at an angle, as at 14. The opposite sides of the slightly curved portion of each tine or prong is beveled from both the top and bottom thereof to provide a cutting edge 15 on the opposite side of each prong or tine, all of said cutting edges being arranged in horizontal alignment and extending from the shank or body 11 to the point 14 where the same are turned upwardly.

By providing cutting edges on all tines or prongs it will be noted that when cutting matter such as hard cake or the like that the first prong engaging the cake will actually do the cutting and the other prongs will pass easily through the path cut thereby, thus preventing the retarding of the cutting action as would occur should not all the prongs be sharpened. It will also be noted that when the device is used as a knife the upturned ends 13, which are not provided with cutting edges, will be out of the way so as not to engage the plate containing the food to be cut.

In view of the foregoing description of my invention taken in connection with the accompanying drawings, it is thought that any further explanation as to the operation and construction of same is unnecessary.

Having thus described my invention, what I claim as new is:

A fork consisting of a body having a handle portion and a shank portion joined with the handle portion and dispsed at an acute angle to the length thereof, the shank portion being divided longitudinally into a plurality of tines which are offset with relation to the handle portion and extend longitudinally in the same general direction as the handle portion, the inner portions of the said tines being provided at their opposite longitudinal edges with relatively sharp cutting edges and the free end portions of the tines merging into extremities which are disposed across a line extended from the median longitudinal dimension of the handle portion and at an acute angle thereto the said extremities of the tines being substantially rectangular in transverse section.

In testimony whereof I have affixed my signature.

HARRY C. SALLAC.